(12) United States Patent
Rinne et al.

(10) Patent No.: US 7,911,995 B2
(45) Date of Patent: Mar. 22, 2011

(54) METHOD, SYSTEM, AND DEVICES FOR JOINT HANDLING OF AT LEAST TWO USERS OVER ONE LOGICAL RADIO CONNECTION

(75) Inventors: Mikko J. Rinne, Espoo (FI); Carl Eklund, Helsinki (FI); Rene Purnadi, Coppell, TX (US); Haihong Zheng, Coppell, TX (US); Khiem Le, Coppell, TX (US); Srinivas Sreemanthula, Flower Mound, TX (US)

(73) Assignee: Nokia Corporation, Espoo (FI)

( * ) Notice: Subject to any disclaimer, the term of this patent is extended or adjusted under 35 U.S.C. 154(b) by 1077 days.

(21) Appl. No.: 10/956,067

(22) Filed: Oct. 4, 2004

(65) Prior Publication Data

US 2006/0013173 A1  Jan. 19, 2006

(30) Foreign Application Priority Data

Jul. 16, 2004  (EP) .................................... 04016809

(51) Int. Cl.
*H04W 4/00* (2009.01)
(52) U.S. Cl. ........ 370/328; 370/392; 370/331; 370/341; 370/352
(58) Field of Classification Search .................. 370/392, 370/331, 341, 389, 352, 254, 412
See application file for complete search history.

(56) References Cited

U.S. PATENT DOCUMENTS

| 5,450,406 | A   | * | 9/1995  | Esaki et al. ................... 370/396 |
| 6,311,288 | B1  | * | 10/2001 | Heeren et al. ..................... 714/4 |
| 6,735,202 | B1  |   | 5/2004  | Ahmed et al. |
| 6,741,575 | B1  | * | 5/2004  | Zhang et al. .................. 370/329 |
| 2004/0078772 | A1 | * | 4/2004 | Balay et al. ..................... 716/12 |
| 2004/0166857 | A1 | * | 8/2004 | Shim et al. .................... 455/436 |
| 2005/0149531 | A1 | * | 7/2005 | Srivastava ....................... 707/10 |
| 2006/0215595 | A1 | * | 9/2006 | Hancock et al. .............. 370/328 |

FOREIGN PATENT DOCUMENTS

| EP | 1 515 574 A1 | 3/2005 |
| WO | WO 01/06732 A1 | 1/2001 |
| WO | WO 2005/076570 A1 | 8/2005 |

* cited by examiner

*Primary Examiner* — Nay Maung
*Assistant Examiner* — Richard Chan
(74) *Attorney, Agent, or Firm* — Harrington & Smith

(57) ABSTRACT

A method and system handles at least one connection to at least one terminal in an access network. The access network includes a radio interface and at least one router. A link layer address is assigned to the at least one terminal, and a cell-specific radio link identifier is used at the radio interface for identifying a radio link to the router. An identifier for identifying the terminal or terminals preferably includes an RLI field for identifying the radio link, and a LLA Mapping field for identifying the terminal.

27 Claims, 2 Drawing Sheets

METHOD, SYSTEM, AND DEVICES FOR JOINT HANDLING OF AT LEAST TWO USERS OVER ONE LOGICAL RADIO CONNECTION

FIELD AND BACKGROUND OF THE INVENTION

The invention relates to a method, system, and devices for connecting multiple mobile terminals into a wireless or cellular network through a mobile router or server such as a bus or train.

FIG. 1 shows a basic example of such a structure. A bus or train 20 serves as a mobile router and carries router equipment and at least one antenna 21 for providing communication between one two or more external base (transceiver) stations BTS1, BTS2 and mobile equipments or terminals of passengers traveling in the bus or train 20.

The invention relates in particular but not exclusively to the mapping of multiple user-plane connections that move together over one physical and logical radio connection.

In case a system should consist of one or more central servers, one or more mobile servers (typically installed in a public transportation vehicle such as a train or a bus), and terminals, the terminals may access local content on the mobile server over a fast wireless connection (typically Wireless Local Area Network, WLAN) which mobile server provides a slower shared connection via some wide-area cellular access (Personal Handyphone System, PHS; General Packet Radio Service, GPRS; or Wideband Code Division Multiple Access, WCDMA). The connections may be tunneled over multiple GPRS and WLAN connections. Mobile terminals thus access outside world through the mobile server. This may be realized by running proxies in the mobile server, causing the mobile terminal connections to terminate in the mobile server. In public internet Internet Protocol version4, IPv4, terminals are visible with the proxy/Network Address Translation, NAT, address of the mobile server. In Internet Protocol version6, IPv6, the terminals may appear with their own addresses.

It might be considered to terminate terminal connections (U-plane and C-plane) in the mobile router which would require address transformation and tunneling means to pass the data from multiple terminals into a base station. The benefit would be that only a single link is required.

It might also be considered to form a separate connection for each terminal through the mobile router. This would provide an independent link for each terminal, but as the server moves, each connection would have to be handed over from base station to base station separately, providing little benefit, apart from some range and power-saving enhancement, over each terminal connecting separately.

SUMMARY OF THE INVENTION

The invention provides a system, method, radio link identifier, radio access network, and router, such as defined in the claims or described below.

By means of the invention, each terminal can maintain a unique Link Layer Address, LLA, which maps directly to a care-of-address, attaching directly to the network IP address. No separate termination or address transformation is required. The LLA does not need to be changed when the terminal accesses or leaves the mobile router coverage area.

For treatment over the link from mobile router to base station, the invention allows common signalling for radio link control, greatly reducing the signalling load compared to having separate connections for each terminal. For the user plane data flow each connection is still treated separately.

DETAILED DESCRIPTION OF EMBODIMENTS

In accordance with at least one or all embodiments of the invention, a Link Layer Address, LLA, is defined which is an interface identifier to enable forwarding of packets within a subnet prefix in IP networks. The subnet or last hop networks can utilize any access medium technology with LLA serving as a unique link identifier in an access network such as a fourth generation, 4G, access network for the last hop router to uniquely identify the node for forwarding the packet in the downlink, DL, direction. The LLA may also be used in the trailing e.g. 64 bit portion of an 128 bit IPv6 address formed by the mobile host. The first part of the IPv6 address is the network prefix advertised by the access router, AR, over that link interface. The LLA in 4G can also be used in the same context as the LLA defined in IPv6. This approach ensures compatibility of all IPv6 functions in the fourth Generation Access Network, 4GAN.

A Care of Address, CoA, is an IP address by which a mobile station of the fourth generation, 4G MS, is identified in the 4GAN. CoA can be configured in a stateless way by combining the network prefix advertised by the AR and appending a 64-bit LLA. CoA is a globally routable address i.e. CoA can be used for mobility binding to the home network and other correspondent nodes to declare the exact location of the mobile terminal. When the terminal moves from one AR to another, the CoA changes.

For the radio interface a separate mapping is adopted. The scope of LLA is rather large, making the identifier long and thus cumbersome to be used for identifying every message on the radio interface. A cell-specific radio link identifier, RLI, is introduced. To better support the mobile router scenario, a two-part identifier consisting of RLI and a separate LLA Mapping, LM, fields is proposed to be used in at least one, some or all, of the embodiments.

Figure 1:
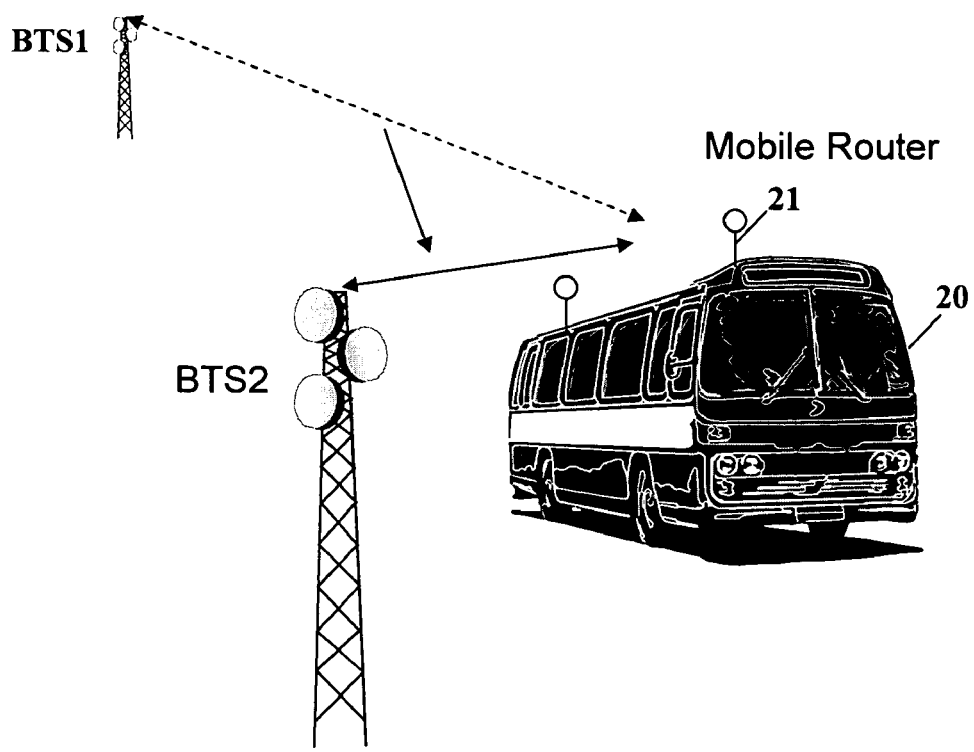
FIG. 1 shows a basic example of such a structure using a mobile router.
Figure 2:
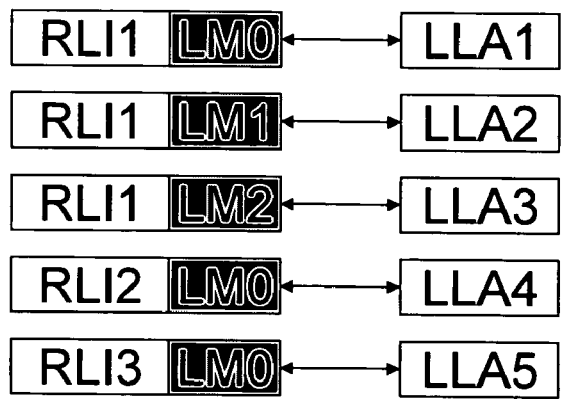
FIG. 2 illustrates an example of a mapping between radio link identifier, RLI; LLA Mapping, LM; and Link Layer Address, LLA, in accordance with an embodiment of the invention.

An example mapping of RLI, LM and LLA is shown in FIG. 2. RLI1 corresponds to, and identifies, a mobile router, which serves three mobile terminals. These terminals get LLA mapping identifiers LM0, LM1 and LM2 which are different from each other so as to distinguish therebetween. Each terminal has its own LLA (LLA1, LLA2 and LLA3), which are used by upper layers to identify the terminal and route user-plane traffic. Radio link identifiers RLI2 and RLI3 identify individual terminals connecting to the same network. Each of these terminals has its own LLA (LLA4, LLA5) and the LLA mapping identifiers, that is the LM field has value zero, LM0. The zero value of the LM field indicates that only one terminal each is assigned to the Radio link identifiers RLI2, RLI3.

The benefit in this arrangement is that for all radio link control operations only the RLI can be used. The LMs can be disregarded for these radio link control operations. E.g. power control and capacity allocation for the radio link can be based on the RLI only. All handover measurements and preprocessing also need to be done only for the RLI. Only one new identifier, the RLI, needs to be allocated by the new base station BTS at handover. The LM values and fields are never used alone without the RLI, and therefore if the RLI is unique in the new BTS then all LM-values can be used as they are.

Figure 3:
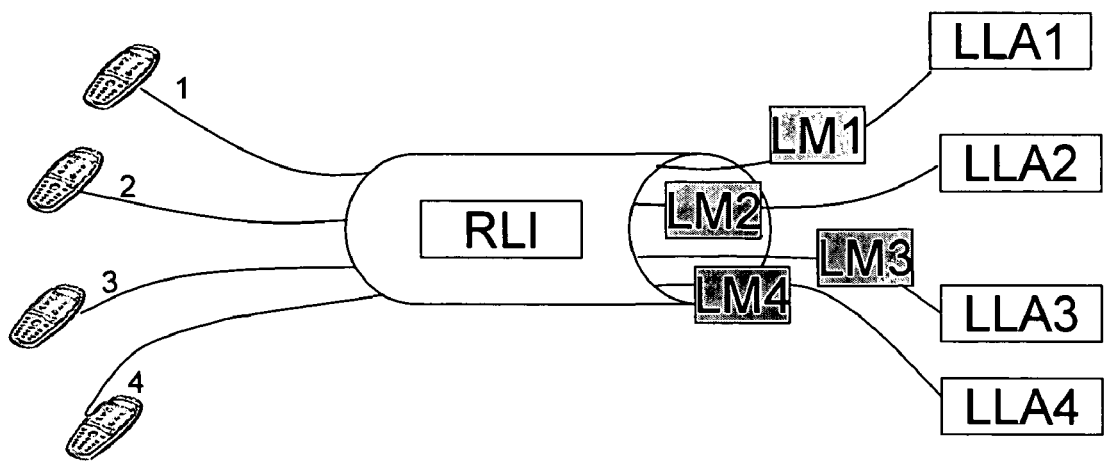
FIG. 3 shows an example of RLI binding together of LLAs.

This arrangement is illustrated in FIG. 3 which illustrates the RLI binding together of the LLA:s. The terminals 1, 2, 3, 4 are bound to the LLAs LLA1, LLA2, LLA3, LLA4, via the same RLI and the individual LM1, LM2, LM3, LM4. For the actual handover, also the mapping of the LM:s to the LLAs is preferably signalled to the new BTS.

The RLI is preferably allocated by the base station. A possible method is to start the RLI value from zero, and allocate new RLIs in ascending order. When connections are terminated, the resulting gaps in the sequence of allocated RLIs may be filled by re-allocating the now unused RLIs to new terminals.

In case of a moving router this RLI+LM combination brings the important benefit that when moving into the coverage area of a new base station, only the RLI needs to be re-allocated by the new BTS, and the LM can stay the same.

There is a further advantageous aspect towards RLI allocation. If the radio interface (and frequency) between the router and terminals is the same as the one used between the router and base station, then some part of RLI:s allocated by the router to the terminals camped under the router can preferably be permanently assigned for that mobile router. Such permanent assigning avoids any confusion which might otherwise result if the same RLI were allocated by both a base station and a mobile router for the same coverage area.

The system can also form the LM part based on any suitable algorithm. There are no specific rules to be respected apart from ensuring that the same mapping is understood by both the base station and the router. The generation of the LM part can, as an advantageous example, start from zero and be allocated in ascending order. Gaps occurring when terminals should leave the coverage of the base station or terminate the connections, may be re-used. According to one of the alternative embodiments of the invention, the assigned LM:s form a contiguous block in the number space. This implementation is advantageous for the signalling of the LM mapping to LLA:s, to a new base station in the network.

Figure 4:
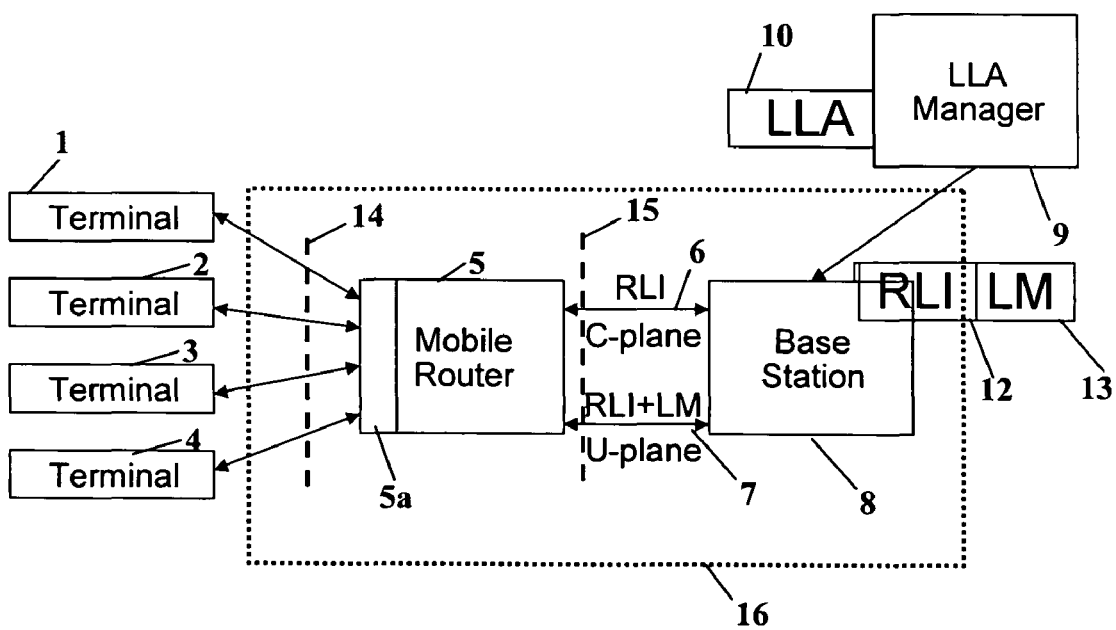
FIG. 4 illustrates an embodiment of a system in accordance with the invention wherein LLA, RLI, LM allocation and mapping over the radio interface are illustrated.

For user plane transmissions also the LM value is indicated to the new BTS at handover, to keep the terminal data flows separate, as illustrated in FIG. 4.

FIG. 4 shows an embodiment of a system for handling at least one connection to at least one terminal 1 to 4 in a radio access network, RAN, 16. The radio access network 16 includes at least one base station 8, at least one radio interface 14, or 15, and at least one router 5 equipped with means 5a to connect to at least one of the terminals 1 to 4. The radio interface 14 is provided between the router 5 and the terminal (s) 1 to 4. The radio interface 15 is provided between the base station 8 and the router 5.

FIG. 4 illustrates LLA, RLI, LM allocation and mapping over the radio interface 15 and/or 14. Also in this case significant savings on the air interface can be obtained. In particular, if data destined for several terminals under the same router is packaged together, the RLI is sent only once while tagging the terminal-specific data with the different LM identifiers.

The LLA is preferably allocated by an entity in the IP network such as LLA manager 9. RLI and LM are allocated by the BTS such as base station 8. In this example embodiment RLI is cell-specific, but also other allocation strategies and scopes can be used.

A link layer address, LLA, is assigned to the at least one terminal, and a cell-specific radio link identifier, RLI, is used at the radio interface 14 or 15 for identifying a radio link to the router 5.

When a new terminal 1, 2, 3, or 4 attaches to mobile router 5, the mobile router 5 sends an LLA ASSIGNMENT REQUEST message to base station BTS 8, including an RLI 12 that has already been allocated to the mobile router 5. The base station 8 forwards the request to LLA Manager 9, which returns a new LLA 10 to the base station 8. As the RLI 12 for this mobile router 5 has already been allocated, the base station 8 returns the new LLA 10, the old RLI 12 and a new LM 13 (such as the first available LM value). An LLA ASSIGNMENT CONFIRM message conveys the new identifiers LLA 10, LM 13 to the mobile router 5, which communicates with the new terminal. At least one, or all, of the base station 8, the mobile router 5, and the LLA manager 9 include a table wherein the mapping of LLAs, RLIs, and LMs to the terminals and routers are listed. By checking the table the proper terminal, router etc can be found.

The base station 8 and the mobile router 5 communicate with each other using control plane, C-plane, 6, and user plane, U-plane, 7. For the C-plane 6, only the RLI is to be transmitted for identifying the radio link. For the U-plane 7, the RLI and the LM values are transmitted for identifying the link and the terminal.

The network architecture and nodes allocating the identifiers shown in the drawings are only presented as an example, and many other implementations are possible in different architectures. Some implementation alternatives will be described below.

The radio technology used for the connection between the terminals and the mobile router can either be the same as the connection from the mobile router to the BTS or it can be different. This has no influence on the invention as such, but may impact the complexity of the router, its deviation from present-day router technology and the radio resource management algorithmic distribution of the network.

The allocation scheme can be used for one of, or both terminals and networks, such as 4G terminals and networks.

The invention provides link layer means of connecting multiple subscriber terminals over a (mobile) router for example in future cellular (4G) access networks.

According to a standalone implementation, or part of embodiments of the invention, a radio link identifier is split into two parts. The first part identifies the logical connection between the base station and the terminal or router, allowing joint management of all connections connecting through the same router. The second part identifies the mapping to a user plane link address, separating each terminal.

The invention claimed is:
1. An apparatus, comprising:
 a processor configured to route a data packet from an access network node to at least one terminal of a plurality of terminals; and
 an interface connector configured to
  provide a common control plane connection between the apparatus and the access network node for the plurality of terminals,
  provide separate user plane connections between the apparatus and the access network node for the plurality of terminals, wherein only a radio link identifier, identifying a router, is used for signalling on the common control plane connection, and wherein a combination of the radio link identifier and a mapping identifier, identifying the at least one terminal, is used for signalling on a first user plane connection of the separate user plane connections, and wherein the mapping identifier corresponds to a link layer address of the at least one terminal.

2. The apparatus of claim 1, wherein the link layer address is unique to the at least one terminal and maps directly to a Care of Address.

3. The apparatus of claim 1, wherein the apparatus comprises a mobile router.

4. The apparatus of claim 1, wherein the interface connector is further configured to receive the radio link identifier and the mapping identifier from the access network node.

5. The apparatus of claim 1, wherein the interface connector comprises a radio interface connector.

6. An apparatus, comprising:

processing means for routing a data packet from an access network node to at least one terminal of a plurality of terminals; and interface connecting means for providing a common control plane connection between the apparatus and the access network node for the plurality of terminals, provide separate user plane connections between the apparatus and the access network node for the plurality of terminals, wherein a radio link identifier, identifying a router, is used for signalling on the common control plane connection, and wherein a combination of the radio link identifier and a mapping identifier, identifying the at least one terminal, is used for signalling on a first user plane connection of the separate user plane connections, and wherein the mapping identifier comprises a unique link layer address of the at least one terminal.

7. A method, comprising:

providing an interface connector, wherein the interface connector is configured to provide a common control plane connection between an apparatus and an access network node, and wherein the interface connector is configured to provide separate user plane connections between the apparatus and the access network node;

using only a radio link identifier for signalling on the common control plane connection, wherein the radio link identifier is configured to identify a router;

using a combination of the radio link identifier and a link layer address mapping identifier for signalling on a first user plane connection of the separate user plane connections, wherein the combination of the radio link identifier and the link layer address mapping identifier is configured to identify a terminal, and wherein the link layer address mapping identifier corresponds to a link layer address of the terminal; and routing a data packet from the access network node through the router to the terminal.

8. The method of claim 7, wherein the using the radio link identifier comprises using the radio link identifier for signalling on the common control plane connection to identify the router.

9. The method of claim 7, wherein the using the combination comprises using the combination of the radio link identifier and a link layer address for signalling on the first user plane connection of the separate user plane connections.

10. The method of claim 7, wherein the using the radio link identifier comprises using the radio link identifier for signalling on the common control plane connection to identify a mobile router.

11. The method of claim 7, further comprising providing a radio interface to the access network node, wherein the radio interface comprises the common control plane connection and the separate user plane connections.

12. The method of claim 7, further comprising:

receiving the radio link identifier and the mapping identifier from the access network node.

13. An apparatus, comprising:

an access network connector configured to provide access for a router to an access network;

an interface connector configured to provide a common control plane connection to the router, provide separate user plane connections to the router, wherein a radio link identifier is used for signalling on the common control plane connection, wherein the radio link identifier is configured to identify the router, and wherein a combination of the radio link identifier and a first mapping identifier is used for signalling on a first user plane connection of the separate user plane connections, wherein the combination of the radio link identifier and the first mapping identifier is configured to identify a first terminal in the access network, and wherein another combination of the same radio link identifier and a second different mapping identifier is configured to identify a second different terminal in the access network;

a link identifier allocator configured to allocate the link identifier to the router;

an access network terminal identifier requestor configured to request an access network terminal identifier for the first terminal; and a mapping identifier generator configured to generate the first mapping identifier for the first terminal based on the access network terminal identifier of the first terminal.

14. The apparatus of claim 13, wherein the first mapping identifier comprises a link layer address.

15. The apparatus of claim 13, wherein the router comprises a mobile router.

16. The apparatus of claim 13, wherein the interface connector comprises a radio interface connector.

17. The apparatus of claim 13, wherein the interface connector is further configured to transmit the radio link identifier and the first mapping identifier to the router.

18. The apparatus of claim 13, wherein the access network terminal identifier requester is further configured to request the access network terminal identifier for the first terminal from a link layer address manager.

19. An apparatus, comprising:

an access network connecting means for providing access for a router to an access network;

an interface connecting means for providing a common control plane connection to the router, providing separate user plane connections to the router, wherein only a radio link identifier is used for signalling on the common control plane connection, wherein the radio link identifier is configured to identify the router, and wherein a combination of the radio link identifier and a mapping identifier is used for signalling on a first user plane connection of the separate user plane connections, wherein the combination of the radio link identifier and the mapping identifier is configured to identify the router and a terminal in the access network, and wherein the mapping identifier corresponds to the terminal;

a link identifier allocating means for allocating the link identifier to the router;

an access network terminal identifier requesting means for requesting an access network terminal identifier for the terminal; and a mapping identifier generating means for generating the mapping identifier for the terminal based on the access network terminal identifier of the terminal.

20. A method, comprising:

providing an interface connector, wherein the interface connector is configured to provide a common control plane connection to a router, and wherein the interface connector is configured to provide separate user plane connections to the router;

using a radio link identifier, identifying the router, for signalling on the common control plane connection;

using a combination of the radio link identifier and a first mapping identifier, identifying a first terminal, for signalling on a first user plane connection of the separate user plane connections, and wherein the interface connector is configured to use another combination of the same radio link identifier and a second different mapping identifier to identify a second different terminal;

allocating the link identifier to the router;

requesting an access network terminal identifier for the first terminal;

generating the first mapping identifier for the first terminal based on the access network terminal identifier of the first terminal; and providing access for the router to the first terminal in the access network.

21. The method of claim 20, wherein the using the combination comprises using the combination of the radio link identifier and a link layer address for signalling on the first user plane of the separate user plane connections.

22. The method of claim 20, wherein the using the radio link identifier comprises using the radio link identifier for signalling on the common control plane to identify a mobile router.

23. The method of claim 20, wherein the providing the interface connector comprises providing a radio interface connector to the router, wherein the radio interface connector comprises the common control plane connection and the separate user plane connections.

24. The method of claim 20, further comprising:

transmitting the radio link identifier and the first mapping identifier to the router.

25. The apparatus of claim 1 wherein the mapping identifier corresponds to an amount of terminals assigned to the radio link identifier.

26. The apparatus of claim 1 wherein the mapping identifier is allocated by the access network node.

27. The apparatus of claim 1 wherein the router is configured to communicate with access network node using the common control plane connection and the first user plane connection, wherein only the radio link identifier is configured to be transmitted on the common control plane connection for identifying a radio link, and wherein the radio link identifier and the mapping identifier are configured to be transmitted on the first user plane connection for identifying the radio link and the at least one terminal.

* * * * *